UNITED STATES PATENT OFFICE.

GUSTAF ALFRED BRINCK AND ALBERT VILHELM REHNSTRÖM, OF STOCKHOLM, SWEDEN.

FOOD FOR CATTLE.

SPECIFICATION forming part of Letters Patent No. 388,339, dated August 21, 1888.

Application filed May 17, 1888. Serial No. 274,170. (No specimens.)

*To all whom it may concern:*

Be it known that we, GUSTAF ALFRED BRINCK and ALBERT VILHELM REHNSTRÖM, both subjects of the King of Sweden, and residents of Stockholm, Sweden, have jointly invented certain Improvements in Feeding-Cakes, of which the following is a specification.

Our invention relates to a prepared food for cattle, and especially for milch cows; and the object of the invention is to utilize in the preparation of a nutritious and easily-digestible food for cattle the caseine of the large quantity of skimmed milk in milk-producing localities for which no market can be readily found.

In carrying out our invention we usually proceed as follows: Of or from the skim-milk we prepare cheese-curds (caseine) in the usual well-known way. From these curds the superfluous water is removed by evaporation, leaving the mass dry. This dried mass is crushed or pulverized by any known means, and the powder is mixed in any suitable proportion with powdered or granulated cereals and oil-cake.

The cereal employed may be meal, ground or otherwise prepared from any edible grain, or from maize or rice, for example.

The oil-cake may be the waste left after extracting essential or other oils from seeds or other vegetable substances. To this mixture of dried caseine, cereal-meal, and oil-cake meal we prefer to add a small percentage of finely-powdered bone-meal, as this substance in small quantity supplies the necessary elements for building up the osseous structure or frame of the animal; but this bone-powder we do not consider as essential. After mixing thoroughly the powdered ingredients to form the food, the mixture is pressed into cakes for convenience of storing and preservation, and these may be fed to the cattle in the same way that oil-cake is usually fed.

We find the following proportions of the ingredients will produce an excellent and satisfactory feed-cake: Dried curd, by weight, thirty per cent.; very fine bone-powder, by weight, three per cent.; fine oatmeal, by weight, seventeen per cent.; linseed-oil cake, by weight, thirty per cent.; rapeseed-oil cake, by weight, twenty per cent; total, one hundred per cent.

By pressing into the form of cakes we wish to be understood as meaning the solidification of the food by pressure into pieces of any form, as in molds, for example.

Our food is nitrogenous to a high degree. It is easy of digestion, tends to increase the secretion of milk, and keeps the cattle in good condition.

Having thus described our invention, we claim—

1. The herein-described composition of matter as a food for cattle, the same consisting of dried skim-milk curds, (caseine,) cereal-meal, and oil-cake, as set forth.

2. As an improved food for cattle, a cake or solidified mixture of dried skim-milk curds, (caseine,) cereal-meal, oil-cake, and bone-meal.

In witness whereof we have hereunto signed our names in the presence of two subscribing witnesses.

GUSTAF ALFRED BRINCK.
ALBERT VILHELM REHNSTRÖM.

Witnesses:
  NERE A. ELFWING,
  GUST. SJÖGRER.